US 8,117,527 B2

(12) United States Patent
Huenemann et al.

(10) Patent No.: US 8,117,527 B2
(45) Date of Patent: Feb. 14, 2012

(54) AUTOMATED FOLIO REFERENCES

(75) Inventors: Geoffrey W. Huenemann, Vancouver (CA); John H. Klippenstein, Roberts Creek (CA)

(73) Assignee: Eastman Kodak Company, Rochester, NY (US)

( * ) Notice: Subject to any disclaimer, the term of this patent is extended or adjusted under 35 U.S.C. 154(b) by 1316 days.

(21) Appl. No.: 11/745,492

(22) Filed: May 8, 2007

(65) Prior Publication Data

US 2008/0278756 A1 Nov. 13, 2008

(51) Int. Cl.
G06F 17/00 (2006.01)
(52) U.S. Cl. ........................................ 715/200
(58) Field of Classification Search .................. 715/200, 715/255; 358/1.17
See application file for complete search history.

(56) References Cited

U.S. PATENT DOCUMENTS

| | | | | |
|---|---|---|---|---|
| 5,283,864 A * | 2/1994 | Knowlton | ...................... | 715/776 |
| 5,867,501 A * | 2/1999 | Horst et al. | .................... | 370/474 |
| 6,192,376 B1 * | 2/2001 | Kincaid et al. | ................ | 707/696 |
| 6,317,818 B1 * | 11/2001 | Zwiegincew et al. | ......... | 711/213 |
| 6,992,790 B2 * | 1/2006 | Mastie et al. | ................ | 358/1.18 |
| 7,016,068 B1 | 3/2006 | Gnocato et al. | | |
| 7,210,102 B1 * | 4/2007 | Gordon et al. | ................ | 715/253 |
| 7,398,461 B1 * | 7/2008 | Broder et al. | ................ | 715/208 |
| 7,681,120 B2 * | 3/2010 | Kikuchi | ........................ | 715/234 |
| 7,797,622 B2 * | 9/2010 | Dejean et al. | ................ | 715/231 |
| 7,859,689 B2 * | 12/2010 | Michel et al. | ................ | 358/1.13 |
| 2003/0004938 A1 * | 1/2003 | Lawder | ............................. | 707/3 |
| 2003/0056174 A1 | 3/2003 | Nara et al. | | |
| 2003/0086719 A1 * | 5/2003 | Dennison et al. | ................ | 399/81 |
| 2004/0194033 A1 * | 9/2004 | Holzwarth et al. | ........... | 715/530 |
| 2005/0034070 A1 * | 2/2005 | Meir et al. | ..................... | 715/530 |
| 2008/0114757 A1 * | 5/2008 | Dejean et al. | ..................... | 707/6 |
| 2008/0133493 A1 * | 6/2008 | Bender | ............................. | 707/4 |
| 2008/0195574 A1 * | 8/2008 | Morgana | ........................... | 707/1 |
| 2008/0270402 A1 * | 10/2008 | Inoue et al. | ....................... | 707/7 |
| 2008/0320207 A1 * | 12/2008 | Ma et al. | ........................ | 711/103 |
| 2009/0228777 A1 * | 9/2009 | Henry et al. | ................... | 715/230 |
| 2010/0293454 A1 * | 11/2010 | Holder et al. | ................ | 715/243 |

OTHER PUBLICATIONS

Weiss, From Talmud Folio to Web Sites: HOT Pages, COOL Pages, and the Information Plenum, IEEE 1998, pp. 97-106.*
Dejean et al., Structuring Documents according to Their Table of Contents, ACM 2005, pp. 1-8.*
Weiss, From Talmud Folios to Web Sites: HOT Pages, COOL Pages, and the Information Plenum, IEEE 1998, pp. 97-106.*

* cited by examiner

Primary Examiner — Cong-Lac Huynh
(74) Attorney, Agent, or Firm — Nelson Adrian Bush (57) ABSTRACT

Sets of electronic pages (120) are typically obtained for processing with a defined order, such as a reader order, and can be referenced by a page index (131) corresponding to the defined order of the page set (130). However, a page index (131) may not correspond to the folio values represented in the page content, which describe a user's intended reference to the page (120). This invention provides a method for examining information associated with the set of pages to identify folio schemes (201) and corresponding folio values (203) which can be associated with pages (120) of the page set (130) to provide a more user-centric reference mechanism to the pages (120).

19 Claims, 13 Drawing Sheets

MONTHLY REPORT ON NEW PRODUCT SALES

August 2006

Prepared by John Doe

Company Confidential

Do not Copy

Table of Contents

| | |
|---|---|
| Executive Summary | ............................................................ 1 |
|     Top 5 Product Area Sales | ............................................................ 1 |
|     Bottom 5 Product Area Sales | ............................................................ 1 |
| Results By Product | ............................................................ 2 |
| Issues For Discussion | ............................................................ 3 | i

Executive Summary

Overall, sales for August 2006 were slightly ahead of plan except for multimedia desktop computers and music CDs. Sales expectations for digital photo finishing, portable music players and flat screen televisions have been exceeded again. Margins for photo finishing have improved dramatically by introduction of new automated processing equipment.

We should move more aggressively in deploying our own online music download service. We should also consider bundling popular software products and phone support with selected home computer products to improve sales.

*Top 5 Product Area Sales*

| Rank | Product Area | Units | Gross Sales | Gross Margin |
|---|---|---|---|---|
| 1 | Flat Screen TVs | 1039 | $3.2M | 55% |
| 2 | Kitchen Appliances | 850 | $1.5M | 35% |
| 3 | DVD Sales | 40000 | $0.76M | 50% |
| 4 | Portable Music Players | 1200 | $0.56M | 60% |
| 5 | Photo Finishing | 875000 | $0.25M | 75% |

*Bottom 5 Product Area Sales*

| Rank | Product Area | Units | Gross Sales | Gross Margin |
|---|---|---|---|---|
| 1 | Desktop Computers | 1000 | $1M | 10% |
| 2 | Music CDs | 20000 | $0.2M | 35% |
| 3 | VHS Recorders | 100 | $0.1M | 25% |
| 4 | Productivity Software | 100 | $0.01M | 50% |
| 5 | Computer Service | 100 | $0.01M | 15% |

Results By Product

| Product Area | Units | Change | Gross Sales | Change | Gross Margin | Change |
|---|---|---|---|---|---|---|
| Flat Screen TVs | 1039 | 25% | $3.2M | 25% | 55% | 0% |
| Kitchen Appliances | 850 | 20% | $1.5M | 20% | 35% | 0% |
| DVD Sales | 40000 | 20% | $0.76M | 20% | 50% | 0% |
| Portable Music Players | 1200 | 10% | $0.56M | 10% | 60% | 0% |
| Photo Finishing | 875000 | 5% | $0.25M | 5% | 75% | 25% |
| Product Area A | 10000 | 5% | $0.2M | 0% | 25% | 0% |
| Product Area B | 10000 | 5% | $0.2M | 0% | 25% | 0% |
| Product Area C | 10000 | 5% | $0.2M | 0% | 25% | 0% |
| Product Area D | 10000 | 5% | $0.2M | 0% | 25% | 0% |
| Product Area E | 10000 | 5% | $0.2M | 0% | 25% | 0% |
| Product Area F | 10000 | 5% | $0.2M | 0% | 25% | 0% |
| Product Area G | 10000 | 5% | $0.2M | 0% | 25% | 0% |
| Product Area H | 10000 | 5% | $0.2M | 0% | 25% | 0% |
| Desktop Computers | 1000 | -10% | $1M | -10% | 10% | 0% |
| Music CDs | 20000 | -15% | $0.2M | -15% | 35% | 0% |
| VHS Recorders | 100 | -5% | $0.1M | -5% | 25% | -10% |
| Productivity Software | 100 | -25% | $0.01M | -25% | 50% | 0% |
| Computer Service | 100 | -25% | $0.01M | -25% | 15% | 0% |

Issues For Discussion

1. Aggressively move to deploy online music sales. CD sales have been steadily declining while purchase of portable music players has been increasing. We can increase music sales, free up floor space for more profitable displays and reduce our warehousing costs.

Costs for accelerating the plan by 6 months will be recovered within 3 months of operation.

2. Our sales and margins for desktop computers, software and computer service have been lagging behind competitors. By bundling high margin software and online/phone customer service we should be able to improve the ongoing sales of each of these product areas by offering more competitive bundle pricing and building product/service loyalty with our customers.

The return on investment is uncertain so we recommend a pilot program on a selected set of product bundles so that we can compare results and make a final decision on strategy within 2 quarters.

INDEX

2006, 1

Aggressively, 3

August, 1 bundling, 1, 3

Computer Service, 1, 2

Costs, 3

Desktop Computers, 1, 2

DVD Sales, 1, 2

Flat Screen TVs, 1

Kitchen Appliances, 1

Margin, 1

Music CDs, 1, 2 phone, 1, 3 photo, 1

Photo Finishing, 1, 2 popular, 1

Portable Music Players, 1, 2

Product Area A, 2

Product Area B, 2

Product Area C, 2

Product Area D, 2

Product Area E, 2

Index-1

Product Area F, 2

Product Area G, 2

Product Area H, 2

Productivity Software, 1, 2

Sales, 1, 2 software, 1, 3

VHS Recorders, 1, 2

Index-2

AUTOMATED FOLIO REFERENCES

FIELD OF THE INVENTION

This invention relates to automated processing of document pages. In particular, it pertains to identifying a sequence of folio values for a sequence of pages and associating the folio values with their corresponding pages so that a page can be referenced by its folio value.

BACKGROUND OF THE INVENTION

In printing, a representation of a folio value may appear on the printed page and folio values for adjacent pages typically observe a sequence scheme. In a book, for example, cover pages typically will not have a folio value. However, other pages of the book may have folio values to facilitate quick page referencing. Different sections may use different folio schemes to distinguish the sections and further facilitate quick reference.

During print production, a document may be received as a single file or as multiple files where a file can include content for one or more pages. Files may be received in an order corresponding to the reader order of the document or they may be received in some other order. Similarly, page ordering within a file may correspond with reader ordering or it may correspond with some other ordering. For example, pages may be reverse reader ordered or have an order with no apparent scheme or a document may contain different versions of one or more pages so that a document can be customized for different audiences.

In some situations, an explicit ordering of a set of pages can be established which may correspond with received file/page ordering or some other ordering information. Ordering information can be determined through a variety of methods. One exemplary method can include reading meta-data identifying one or more page orderings. For example, meta-data can be included in one of the files providing page content or can be included in a separate file or in other associated data. Another exemplary method can include reading an ordering scheme encoded in file attributes (e.g. file name). As another example, a user can manually determine an order based on information (e.g. document structure) from the provider of the files and information derived from the files (e.g. filenames, number of pages).

It is common for print production tools to process pages of a document in a sequence. So establishing an ordered set of pages is a prerequisite for many tools. For example, imposition software may require a reader ordering so that layouts can be produced. Raster image processing software may also render pages in a page-wise fashion for proofing based on reader order or some other order.

Figure 1:
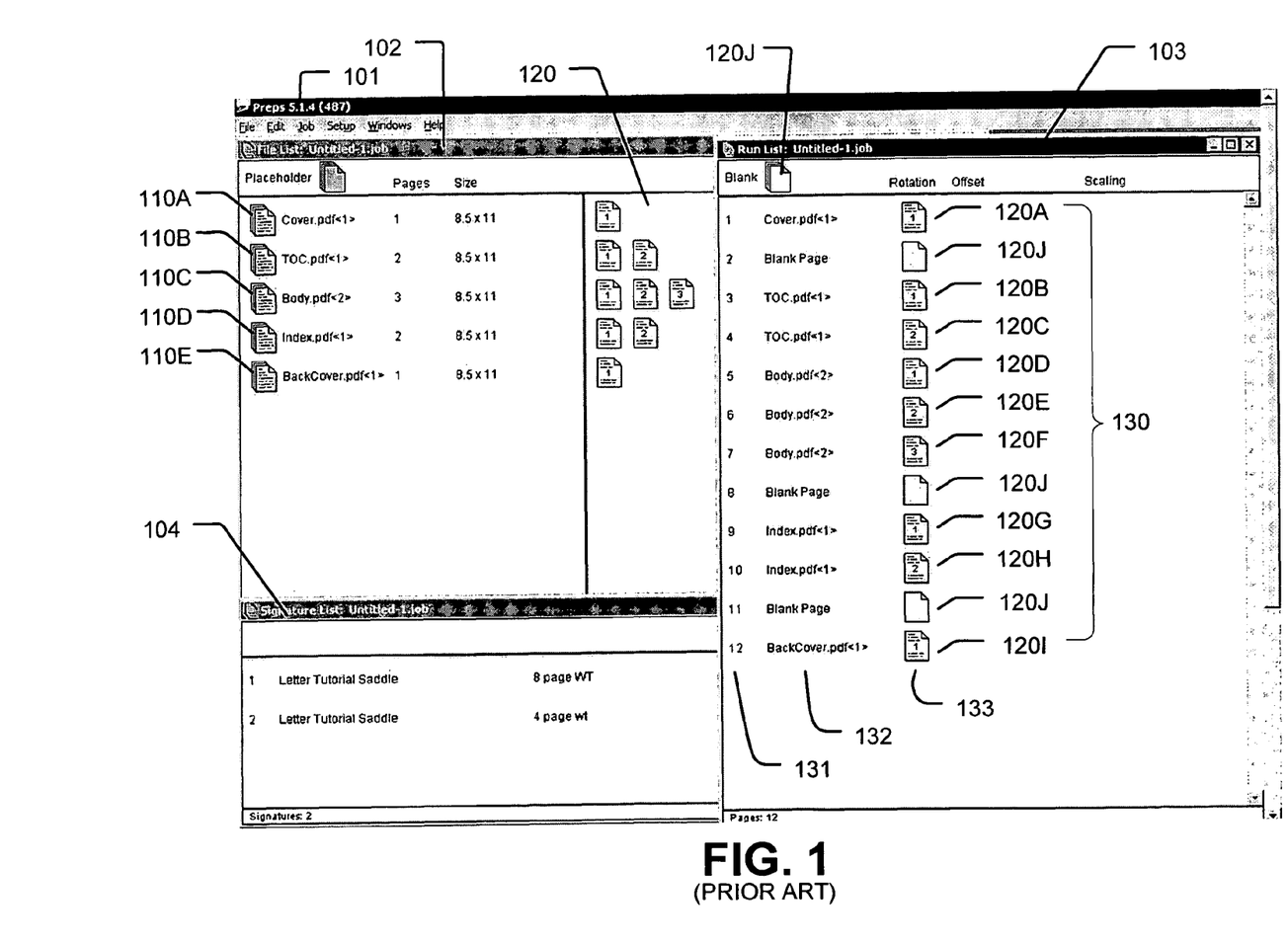
FIG. 1 illustrates a GUI for an exemplary prior art imposition tool.

To reduce complexity, prior art print production tools have used simple techniques for ordering sets of pages. One exemplary technique has been to index the pages using a simple ordinal scheme. Another exemplary technique has been to link pages together in a list. These techniques are suitable for situations which only require reference to a page by its position in the entire page set. FIG. 1 illustrates a GUI for an exemplary prior art imposition tool which allows an operator to manually establish an indexed, ordered page set based on a set of input files so that the pages can be assigned to a generic signature layout based on their indices. Another example includes a system described in U.S. Pat. No. 7,016,068 (Gnocato et al.), which is commonly-assigned and whose contents are included by reference herein.

However, in some situations, it is preferable to reference a page or sequence of pages by folio value. For example, a printer may want to produce layouts by section so that different versions of a section can be easily substituted. As another example, a printer may want to proof certain pages of each section. With a simple ordering technique it can be difficult to locate the pages of interest or verify that pages are being used as intended (e.g. only one section's pages assigned to a layout).

Other problems can occur during print production that are not easily identified by the use of a simple page ordering technique. For example, the ordering of pages in a page set may be incorrect. This may occur, for example, by pages being received out of order, or through human error in creating filenames that imply order or an error in assigning pages to a position in a page set. This may also occur, for example, if the author supplies the wrong page content for a page (e.g. provides the same page twice).

Providing folio references to pages is one way of overcoming these problems since this allows a print production operator to reference pages using the same scheme intended by the author and corresponding to representations on a printed result. Some prior art tools provide a means to do this manually. For example, Adobe Acrobat®, provides a "Number Pages" function that allows one or more pages to be manually associated with a folio scheme. This can be a problem because of the time required, which can be considerable for a book or other large document. The manual approach is also subject to human error.

Thus, a need exists for an automated method for associating folio values with pages of an ordered page set to solve the problems discussed above.

SUMMARY OF THE INVENTION

The present invention provides an automated method for identifying at least one folio scheme for an ordered page set. The method can include associating a sequence of folio values with a sequence of pages of the ordered page set according to an identified folio scheme. Page set ordering can be based on a simple ordering technique similar to ones described in the background or some other technique.

According to one aspect of the invention, a page set is automatically examined to infer at least one folio scheme for the page set. A folio scheme can include information about folio values whose representations should appear in page content. Inference can be derived from information associated with the page set. Once a folio scheme is inferred, content from pages of the page set can be examined to determine if a page sequence exists that is consistent with the folio scheme. If a page sequence is identified that is consistent with the folio scheme, a folio sequence is created for the page sequence. Folio values of the folio sequence are associated with corresponding pages of the page sequence.

According to another aspect of the invention, a folio scheme for a page set can be assumed and content from pages of the page set can be examined to determine if a page sequence exists that is consistent with the folio scheme. This may be more efficient if some folio schemes have a higher probability of being used for certain pages than other schemes.

According to another aspect of the invention, a page area is identified as a probable location for content including a representation of a folio value. This may increase the efficiency and accuracy of examining page content.

According to another aspect of the invention, identifying a folio scheme for a page set can include identifying pages of the page set that may be inconsistent with identified folio schemes. Information obtained during examining page content can be presented to a user to assist in validating folio schemes and identifying problems with the page set.

In other words, and without limiting the scope of the invention, the present invention provides systems and methods for processing pages including: obtaining a page set including an ordered plurality of pages; and automatically identifying a folio scheme for the page set.

DETAILED DESCRIPTION OF THE INVENTION

FIG. 1 illustrates GUI 101 for an exemplary computerized prior art imposition tool that could benefit from aspects of the present invention. GUI 101 depicts three panes for imposing pages according to a set of layout instructions.

Files pane 102 illustrates a set of input files 110A-110E corresponding to an exemplary document to be printed. Each input file 110A-110E includes content for one or more pages 120A-120J. For the exemplary document, the author has supplied a separate file 110A-110E for each section of the document. File 110C, for example, corresponds to the body of the document and includes contents for three pages (i.e. pages 120D-120F).

Run list pane 103 illustrates a page set 130 including an ordered set of pages 120A-120J. Run list pane 103 depicts tabular information for page set 130, including page indices 131 depicting ordinal values for referencing each page 120A-120J, file references 132 depicting an origin (e.g. input file 110A-110E) for each page 120A-120J, and page symbols 133 depicting a desired rotation for referenced page 120A-120J and a relative position of referenced page 120A-120J with respect to its origin.

The ordering of page set 130 can be established, for example, by dragging and dropping pages 120A-120J into run list pane 103. Dropping a page 120A-120J before or after another page 120A-120J can establish the relative order amongst pages 120A-120J. Note that the operator has dragged and dropped multiple instances of blank page 120J into page set 130. This may have been done, for example, to enforce pagination rules established by the author or the printing firm (e.g. table of contents must start on an odd-numbered page and back cover must be an even-numbered page). Alternatively, the author could have explicitly included copies of blank pages 120J in files 110A-110E.

Signatures pane 104 depicts two layouts to be used for printing pages from page set 130. Each layout is configured to reference a page index 131 of page set 130. Different signatures could be included for printing on different equipment or for printing a subset of page set 130. In a more typical example of document printing, page set 130 might contain hundreds of pages including a majority of body pages, organized in chapters. The printing operator might want, for example, to quickly locate pages for one section and associate them with a layout. GUI 101 might make this task overly complicated or error prone as the operator might have to guess at the page index 131 range corresponding to the section or click on several page symbols 133 to view a thumbnail of corresponding pages 120A-120J to identify the page indices corresponding to the beginning and end of the desired section.

Figure 2:
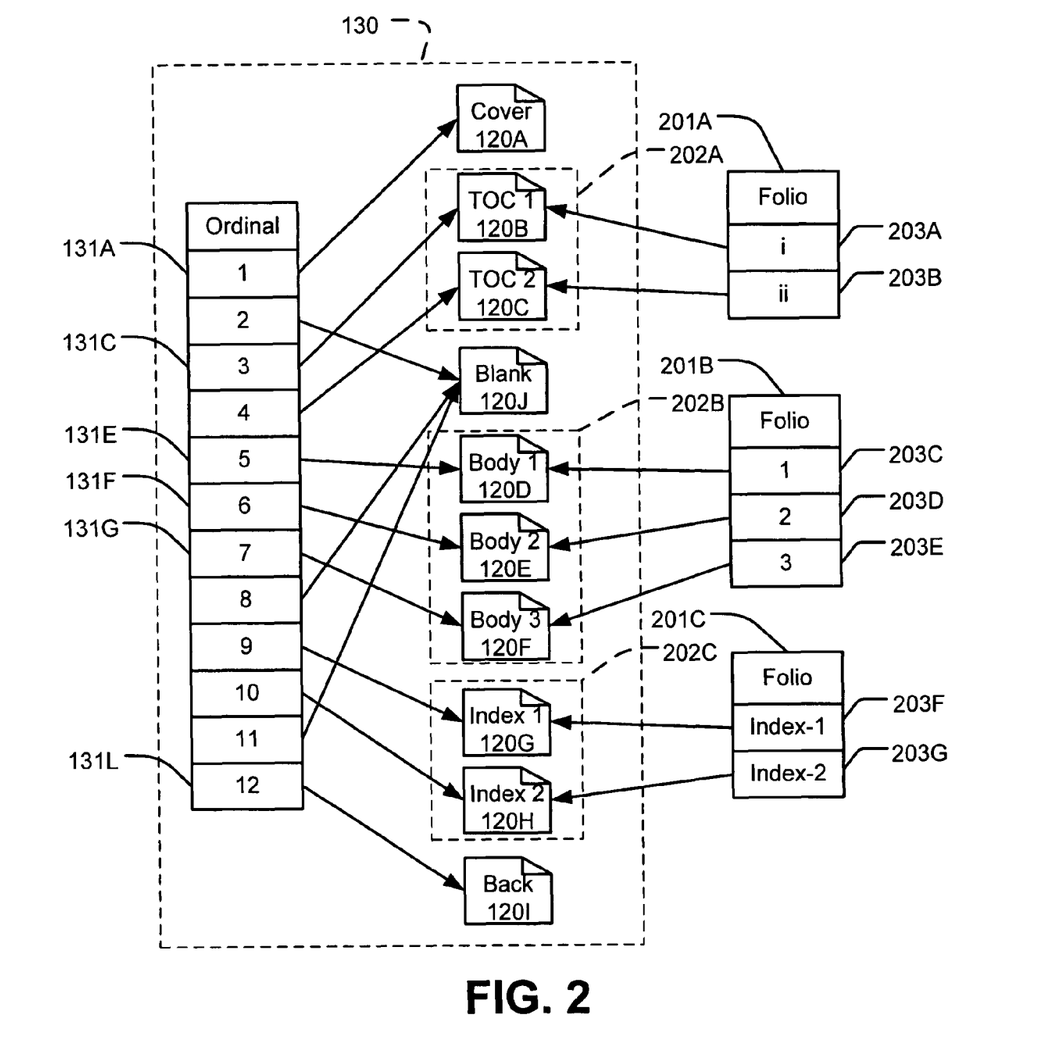
FIG. 2 illustrates a method for processing ordered page set including folio sequences associated with page sequences of the page set according to the present invention.

FIG. 2 illustrates information for an exemplary ordered page set 130 according to one embodiment of the invention. Consistent with FIG. 1, page set 130 includes page indices 131A-131L in association with pages 120A-120J. Arrows connecting them illustrate the ability for software to supply a page index 131A-131L to page set 130 and obtain information, including content, for associated page 120A-120J. Other information, such as origin and relative position can also be made available through page set 130.

FIG. 2 also illustrates an exemplary result of performing methods of the present invention. The exemplary result includes creating folio sequences 201A-201C for page set 130 and associating them with page sequences 202A-202C. Folio sequences 201A-201C include ordered sequences of folio values 203A-203G which are associated with pages 120A-120J having representations of folio values 203A-203G included in their content.

Folio sequence 201A-201C is associated with folio scheme information. For example, folio scheme information can include a first folio value and other information which characterizes a sequence of folio values. For example, folio scheme information could indicate that only even-numbered (i.e. right-hand) pages include folio value representations. Thus, an alternative folio scheme for folio sequence 201B could result in folio values: "1", null, "3". Many other possible folio schemes are possible for folio sequences and can include schemes configured by a user. A predefined folio scheme can be used to dynamically generate more specific folio schemes. For example, a folio scheme defining a simple folio value pattern (e.g. 1, 2 . . . ) can be used as a template for a dynamically generated folio scheme that defines a more complex folio value pattern (e.g. Chapter1-1, Chapter1-2 . . . ).

Page sequences 202A-202C correspond to adjacent pages selected from page set 130. For example, page sequences 202A-202C can be identified based on their origin. Thus, pages 120A-120J of page sequences 202A-202C retain their relative ordering defined by page set 130. Arrows connecting folio values 203A-203G with pages 120B-120H illustrate the ability for software to supply folio value (e.g. 203A) and obtain information for associated page (e.g. 120B). In cases where a folio value is not unique for page set, the associated page can be uniquely identified by supplying the identity of the folio sequence and the corresponding folio value. Thus, according to the methods of the present invention, page 120B, for example, can be referenced either by page index 131C or folio value 203A.

A variety of methods can be utilized to automatically associate folio sequence 201A-201C with page sequence 202A-202C. Some exemplary methods are outlined below. Methods and their variations can be included in a computerized embodiment of the invention (e.g. a software library or tool provided as part of a system or distributed independently) and selected through a variety of means. In some embodiments, methods can be selected iteratively until one is successful. Alternatively, various methods can be selected concurrently or iteratively to produce a variety of solutions. A heuristic approach, for example, could be employed to pick a preferred solution.

Selecting a method can occur manually or can occur automatically based on default values configured for a software tool. Alternatively, method selection can be based on information about the documents. For example, in certain markets or for certain types of documents some folio schemes may be more prevalent than other schemes. As another example, a software tool can keep track of schemes previously associated with documents or parts of documents and can associate that information with information about the author, type of document, or other attributes. Thus, when a new document is to be processed, information about that document can be used to access historical information and guide the method.

Inference Method

One exemplary method for associating a folio sequence with a page sequence is based on inferring a folio scheme from information associated with page set 130. A candidate folio sequence (e.g. 201A) can be created for a candidate page sequence (e.g. 202A) based on the inference. Then content for referenced pages (e.g. 120B-120C) can be examined to confirm the inference. Confirmed folio sequences can be retained for use while remaining unconfirmed candidate folio sequences can be either manually confirmed or rejected by a user. Also, pages having no association with a folio sequence can be automatically or manually confirmed as independent or manually assigned to an adjacent folio sequence.

Variations on the broad method can be employed to infer a folio scheme. One example is to establish rules which can be used to infer a folio scheme from the names of input files from which pages originated. A rule could include, for example, a character pattern which, if present in the filename, would indicate the presence of an associated folio scheme for at least some of the pages derived from the file.

As another variation example, files that include searchable text information can be examined for strings that have a high probability of being folio values. For each examined page, a set of probable folio value representations can be stored in association with page. The number of occurrences of each representation can also be stored along with any other information (e.g. adjacent strings) that might be useful in confirming an inferred scheme.

Rules can be established for identifying which strings are probable folio value representations. Given a list of probable folio value representations, other rules can be established for determining which folio scheme or schemes are the best candidates for the probable folio value representations. Rules could be configured with weightings so that a probability for a folio value representation and/or a folio scheme can be computed. Some exemplary rules are listed below. It will be clear to one skilled in the art that many other rules could be created or configured by an end user.

One rule could indicate that a string is more likely to be a folio value representation if it matches a pattern (e.g. integer numerals or roman numerals or prefixed numerals) for a predefined folio scheme.

Another rule could indicate that a string is more likely to be a folio value representation if it's value is consistent with page index 131 for the page (e.g. string "xv" is found on the fifteenth page of the document or the fifteenth page of a file corresponding to the document or the fifteenth unassociated page of a file).

Another rule could indicate that a string is more likely to be a folio value representation if it is present on a page suspected of being a table of contents or an index. Determining whether a page is an index page, for example, could be determined from the filename or by identifying the string "index" in page content and/or by determining the position of page within page set 130.

Another rule could indicate that a string is less likely to be a folio value representation if it occurs on a page having strings with values from a corresponding folio scheme (e.g. "I" is less likely to be a folio value on a page also containing strings "II" and "III").

Another rule could indicate that a string that is part of a referencing string is more likely to be a folio value representation. For example, an exemplary rule could cause the string "(pp. 21)" to identify "21" as a probable folio value representation for some other page.

Another rule could indicate that a folio scheme is more likely to apply if adjacent pages contain highly probable folio value representations that are consistent with the same scheme (e.g. strings "13", "14", and "15" are included in content for consecutive pages).

Another rule could indicate that a folio scheme involving more complex folio values (e.g. 5.2-1) is more likely to apply than a less complex folio scheme. Yet, another rule could prioritize the selection of one equally probable scheme over another.

As another variation example, files containing graphic state information (e.g. PDF or PostScript files) can provide additional information to assist in inferring a folio scheme. For example, the location of text strings on a page can be determined from graphic state information. Rules for assigning probability of a string being a folio value representation can thus also include location information. For example, strings located near the margins of a page could be assigned a higher probability of being folio value representations.

As another variation example, examining content could be restricted to one or more predefined locations so that examining could occur more quickly and accurately. Locations could be relative to boundaries or other reference points of a page or could be manually specified by using a marquee tool on a sample page.

As another variation example, files containing image information can first be processed using well known optical character recognition (OCR) methods to extract textual and location information. This can be particular relevant for files whose only content is image information (e.g. TIFF or JPG files). Then, a variation described above can be used.

In some situations, absolute confirmation of an inferred folio scheme may not be possible. For example, examining content for a referenced page may determine that a folio value representation exists in content for the page but that some aspect of the representation is inconsistent with the folio scheme or other pages. One inconsistency could be that the correct folio value representation exists on a page but at a location inconsistent with locations for similar representations from adjacent pages. The folio scheme could also include information about allowable locations for a representation of a folio value to appear in content for a page. This could allow, for example, representations of folio values to appear at different locations but still be consistent with the scheme (e.g. odd-numbered location and even-numbered page location).

Upon determining an inconsistency, information about the nature of the inconsistency can be associated with a candidate folio so that a user can quickly assess the inconsistency. This information could include a consistency rating based on pre-determined rules for qualifying the degree of consistency. For example, one rule might lower the rating based on the variance of the location of a folio value representation from an expected location. Another exemplary rule might lower the consistency rating based on the proximity of other content to the location of the folio value representation. Thus, automatic confirmation could be configured to occur if a consistency rating had a value above a certain threshold.

Equally probable candidate folio schemes are another example where user input could be used. Candidate folio sequences could be presented along with information determined while examining content from pages. One scheme could be selected or both rejected. A user could also request that another iteration of folio scheme identification.

For an inferred folio scheme various candidate folio sequences could be created. One exemplary approach can attempt to create the longest folio sequence that could apply (e.g. each associated page includes a highly probable representation of a consistent folio value Another exemplary approach can attempt to create the longest folio sequence whose associated pages include confirmed representations of folio values. Another exemplary approach can attempt to create the longest folio sequence that does not conflict with an adjacent folio sequence 201A-201C (e.g. a blank page 120J could be the beginning of one folio sequence (e.g. 202B) or the end of another (e.g. 202A)).

Assumed Method

Another exemplary method for associating a folio sequence with page sequence is based on assuming the existence of a folio scheme. Then, similar to the methods described above, content for pages can be examined for consistent folio value representations.

According to one embodiment of this method, an assumed folio scheme can be checked against candidate page sequences of different length starting at one end of page set 130 to form a first folio sequence including associations to pages having content with consistent folio value representations. Then, a different folio scheme can be assumed for remaining pages in an iterative fashion. If an assumption proves incorrect, another assumption can be made until one is found that appears correct. The method progresses until all pages have been associated with a scheme or checked against all potential schemes and thus declared independent.

The method can iterate based on different starting assumptions and record results for each iteration. Rules can be created to decide which iteration's results are preferred. For example, a rule could indicate that the iteration producing the longest folio sequence or the longest average folio sequence is the preferred iteration. Alternatively, the results of some iterations could be presented to the user for final selection.

Detailed Example

Figure 3:
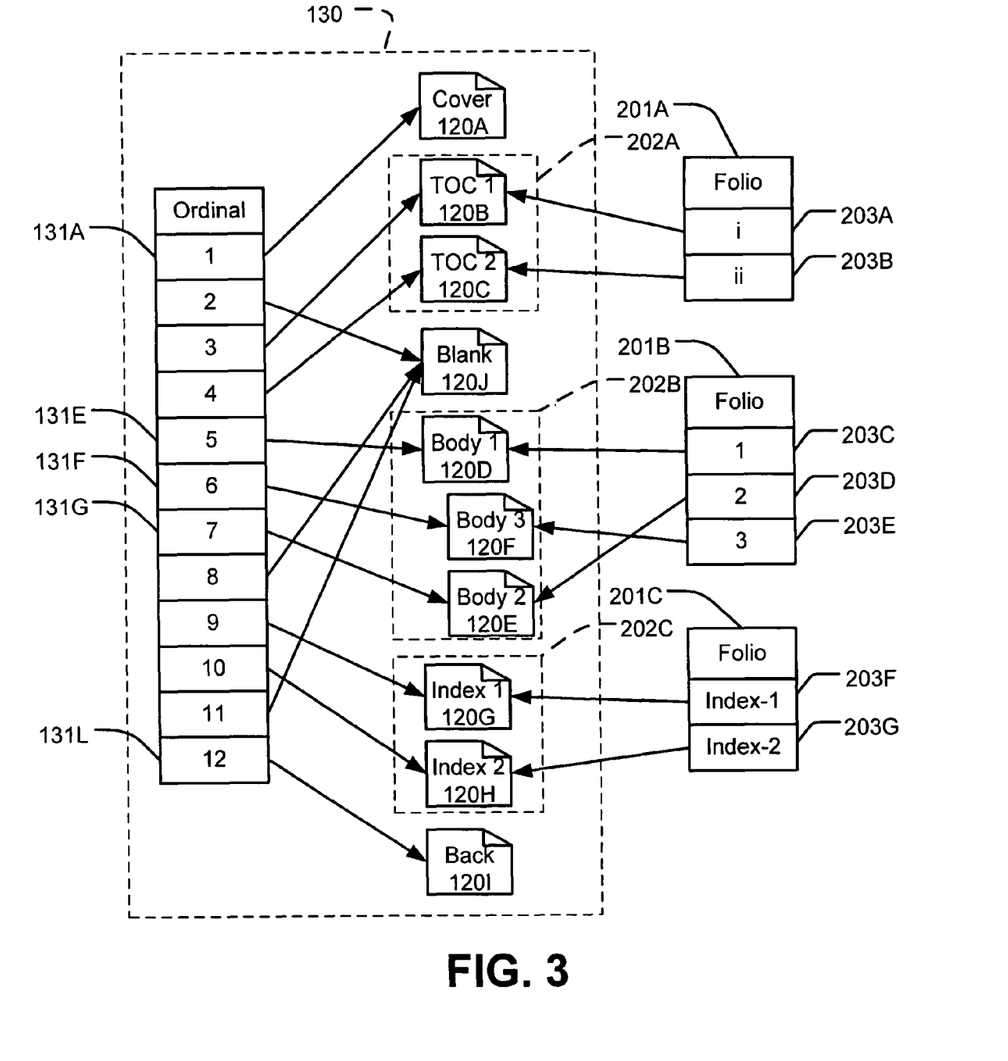
FIG. 3 illustrates a method for processing page set including inconsistent pages according to the present invention.

FIGS. 4-9 illustrate exemplary content for pages 120A-120J of page set 130 of FIG. 3. Note that the order of pages 120E and 120F have been reversed in page set 130. One variation of the inference method is described below to further clarify aspects of the invention.

Figure 4:
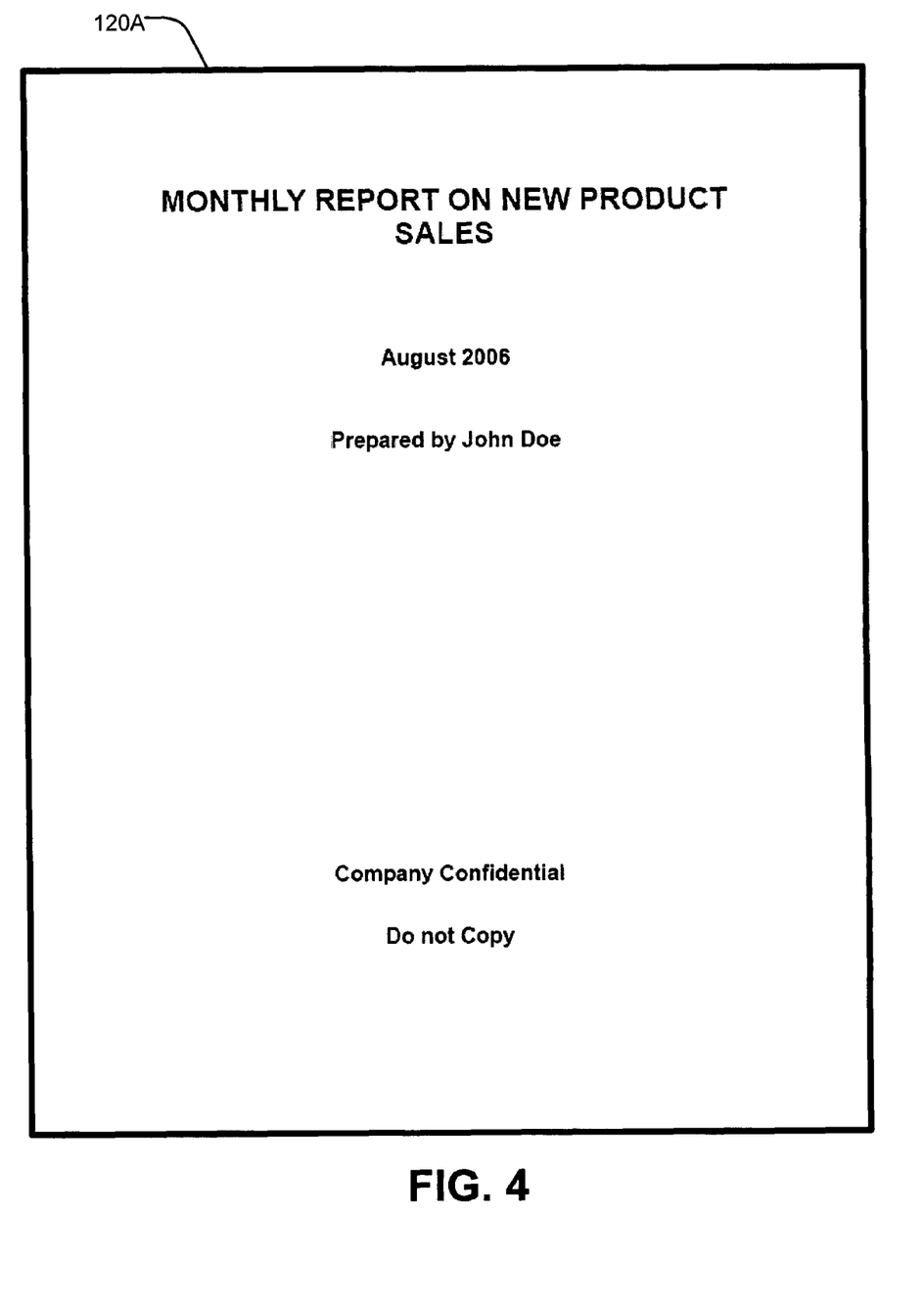
FIG. 4 illustrates an exemplary cover page for the exemplary page set of FIG. 3.

The example begins with a user configuring rules to assign a higher probability for folio value representations that are in close proximity to the page margins. All pages 120A-120J are examined to identify potential folio value representations. Page 120A from file Cover.pdf, illustrated in FIG. 4, is examined first. Potential folio value representations include: "2006" since it could be part of an integer folio scheme. Since this value is not near any margin and doesn't seem to correspond with the number of pages in page set 130, this representation can be assigned a very low probability. Without additional information cover page 120A could be declared an independent page. A final decision could also be reserved until its adjacent page is examined. For example, if page 120B had a representation of "2007" and could not be associated with another folio scheme, pages 120A-120B could be associated with an unconfirmed integer folio sequence that appears to have some inconsistency (e.g. missing the first few thousand values).

Figure 5:
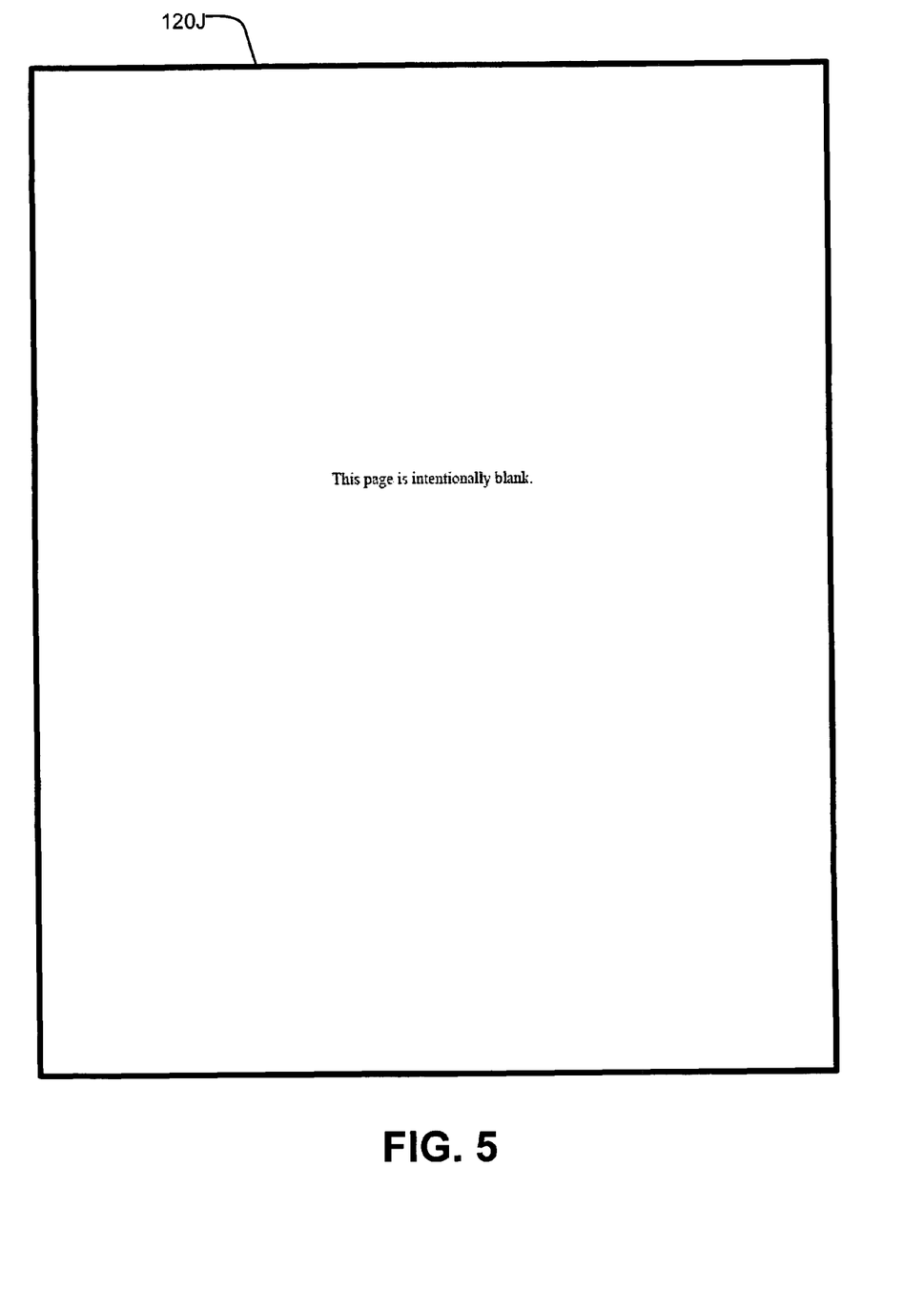
FIG. 5 illustrates an exemplary blank page for the exemplary page set of FIG. 3.

Blank page 120J of file blank.pdf, illustrated in FIG. 5, is examined next in accordance with the order of page set 130. No potential folio value representations are identified and the page can be tentatively declared an independent page pending examination of adjacent pages. Another rule could also be created indicating that a blank page referenced multiple times in page set 130 is automatically declared an independent page. Alternatively (not shown), a rule could be configured to allow a folio scheme to be terminated by a null folio value (e.g. referencing a page with no folio value representation). This might improve the usability of the GUI by having fewer unassociated pages and might be conceptually more correct in terms of identifying the correct number of pages for a layout.

Figure 6A:
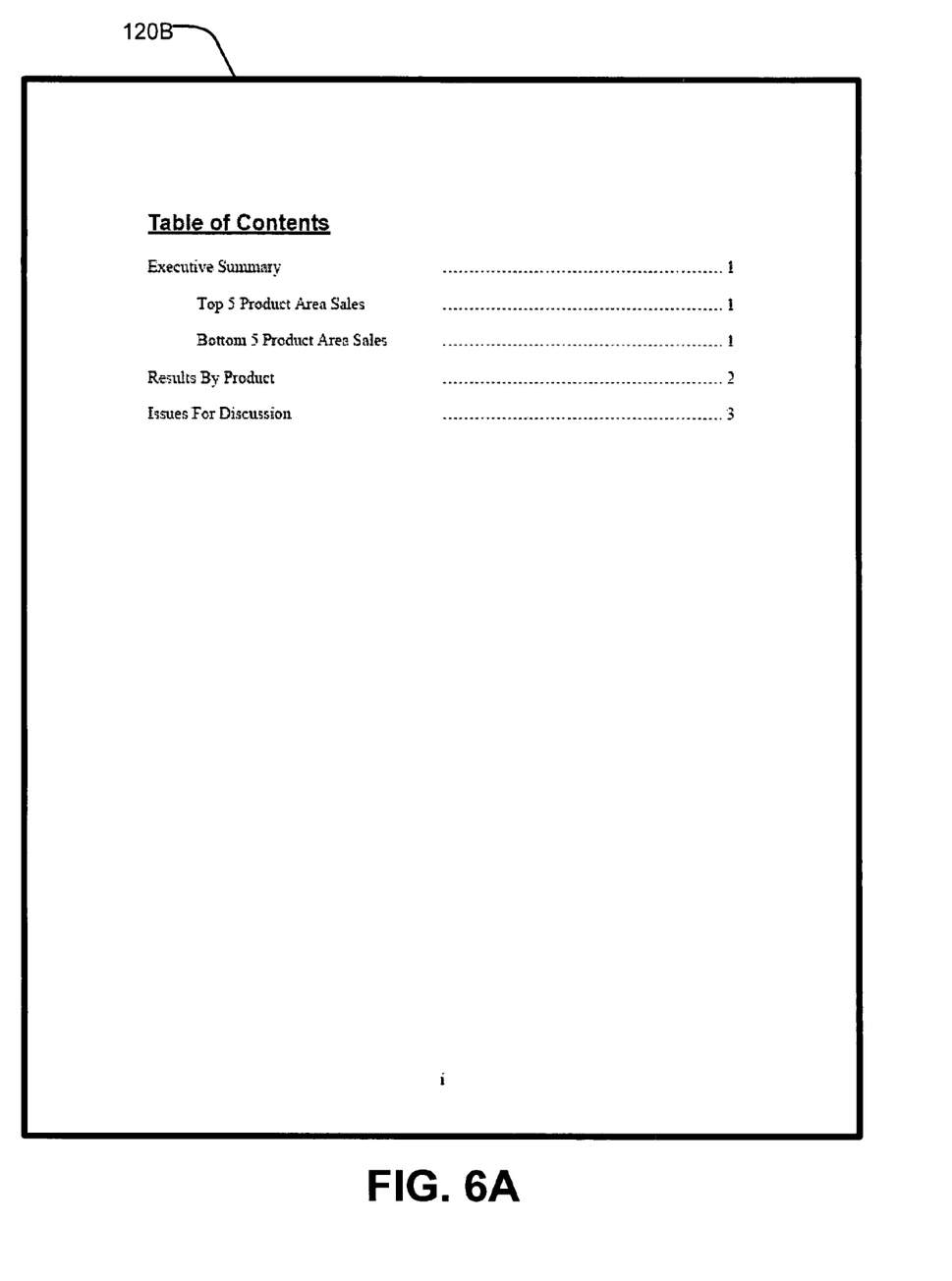
FIGS. 6A and 6B illustrate exemplary table of content pages for the exemplary page set of FIG. 3.
Figure 6B:
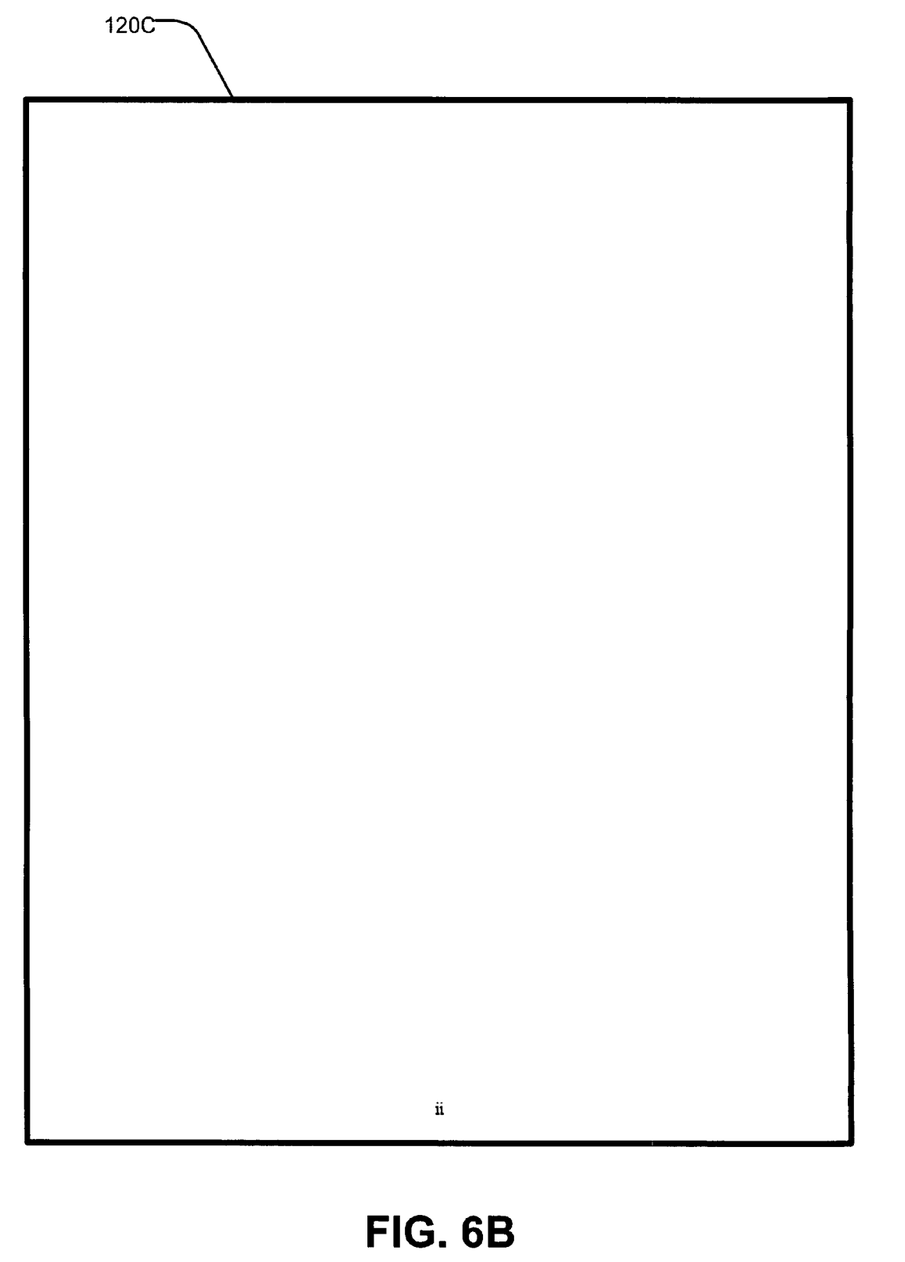

Pages 120B-120C of file TOC.pdf, illustrated in FIGS. 6A-6B, are examined next. Potential folio value representations identified include: margin body strings ("1", "2", "3"); interior body string ("5"); and footer strings ("i", "ii"). String "5" could be assigned the lowest probability because it not near a margin. Strings "1", "2", and "3" could each be assigned a higher probability because each is located near a margin. Footer strings "i", and "ii" could be assigned the highest probability because each is located near a margin and each is consistent with the relative page number of TOC.pdf which included the string. Without additional information, pages 120B-120C could be associated with a lower case roman numeral folio scheme. Folio sequence 201A could be created with folio values 203A-203B assigned the values "i" and "ii" respectively. Since additional pages exist, this scheme could become the leading candidate pending review of adjacent pages.

Note also that recognition of "TOC" in the filename and/or recognition of the string "Table of Contents" in the content of TOC.pdf could raise the probability of some other pages 120D-120J being associated with an integer folio scheme based on identification of the margin body strings.

Figure 7A:
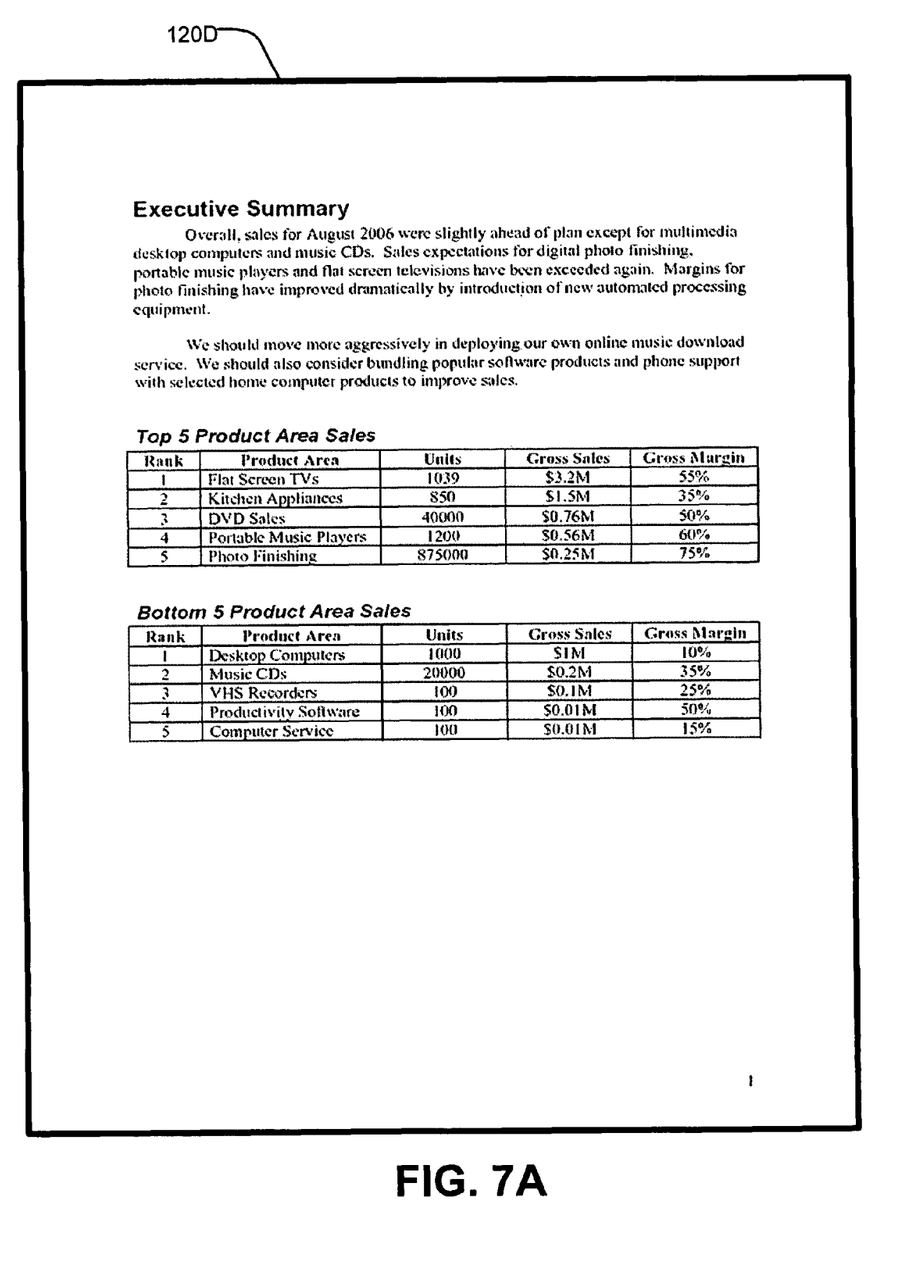
FIGS. 7A-7C illustrate exemplary body pages for the exemplary page set of FIG. 3.
Figure 7B:
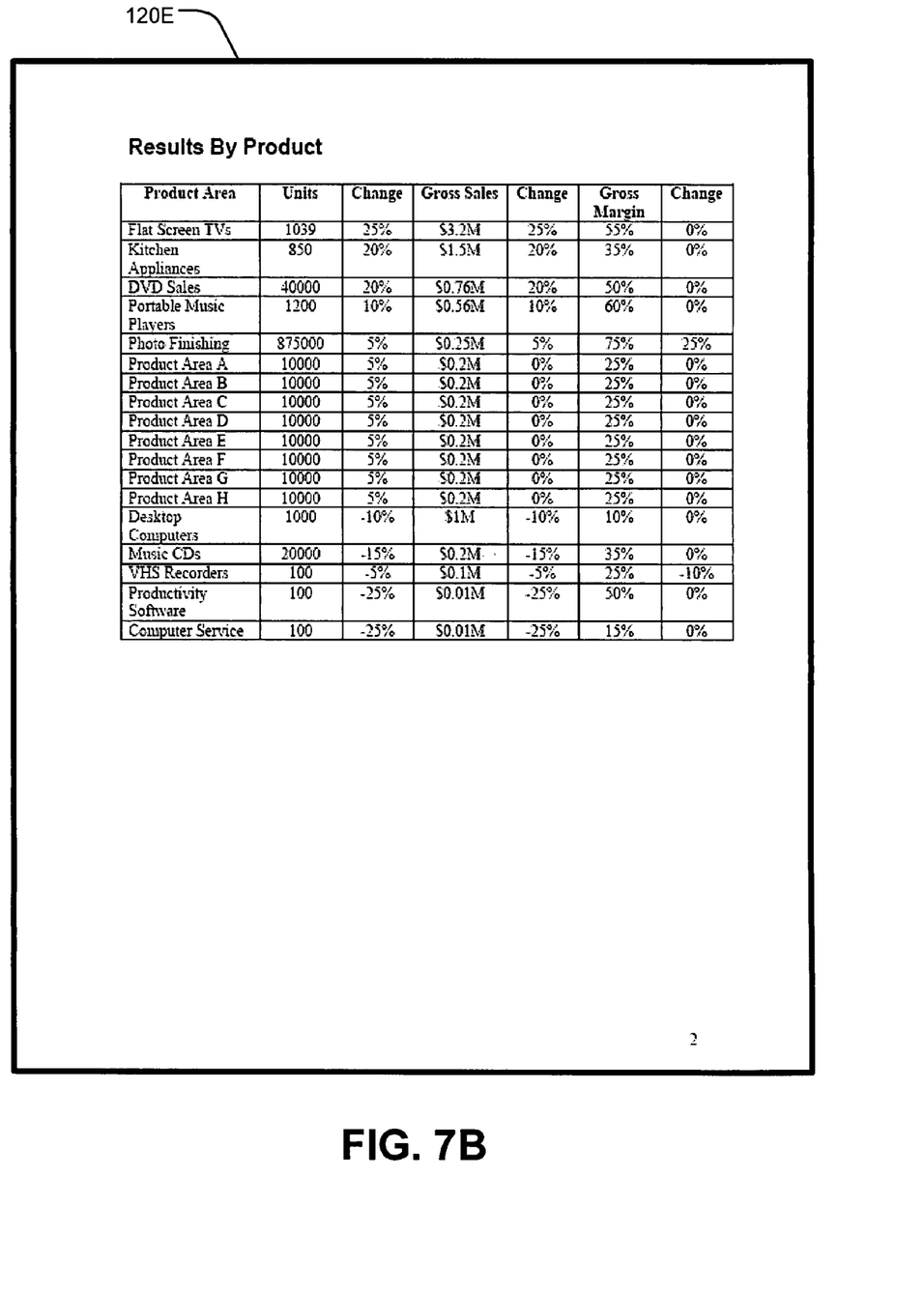
Figure 7C:
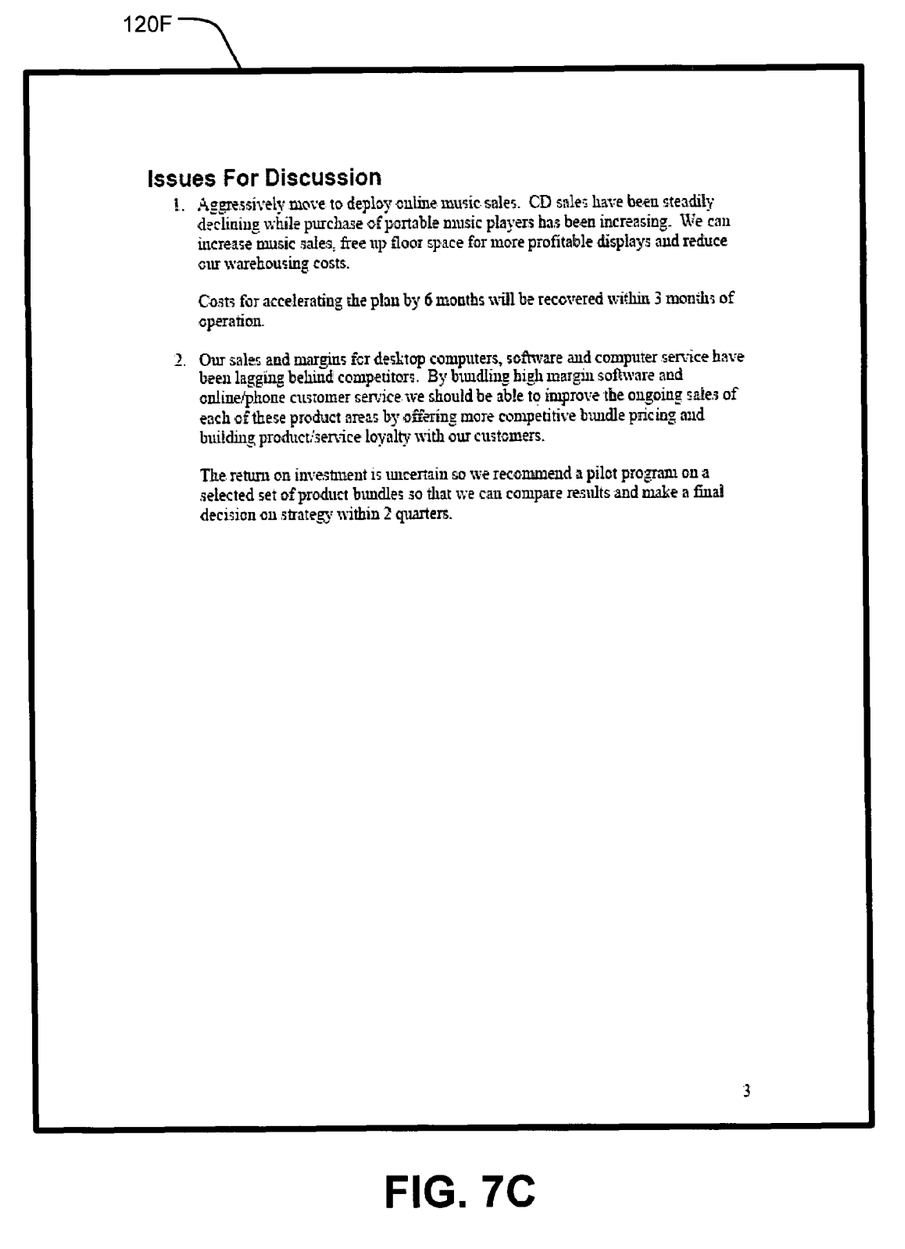

Pages 120D-120F of file Body.pdf, illustrated in FIGS. 7A-7C, are examined next. Potential folio value representations identified include: interior body strings ("2006", "5", "6", "3", "2"); table strings (many integers and uppercase alphas, some near the margins); margin body strings ("1", "2"); and footer strings ("1", "2", "3"). If the pages 120D-120F were ordered correctly, footer strings could be given the highest probability because of their margin proximity and relative page number consistency.

However, since the order of page 120E and 120F have been reversed, the footer strings and some of the table strings might appear to be equally probable (or improbable). Information obtained early from examining TOC.pdf could be used to give the footer strings a higher probability. Alternatively, another rule could be configured, indicating a moderate probability for representations that are consistent with the number of pages in a sequence as a set even though the order of the representations is not consistent. This rule could give preference to an integer folio scheme. Thus, without additional information, pages 120D-120F could be associated with an unconfirmed integer folio scheme. Folio sequence 201B could be created with folio values 203C-203E assigned the values "1", "2", and "3" respectively. The apparent order inconsistency between page set 130 and folio sequence 201B could be identified to the user who could then change the positions of pages 120E-120F to allow folio sequence 201B to be confirmed.

Figure 8A:
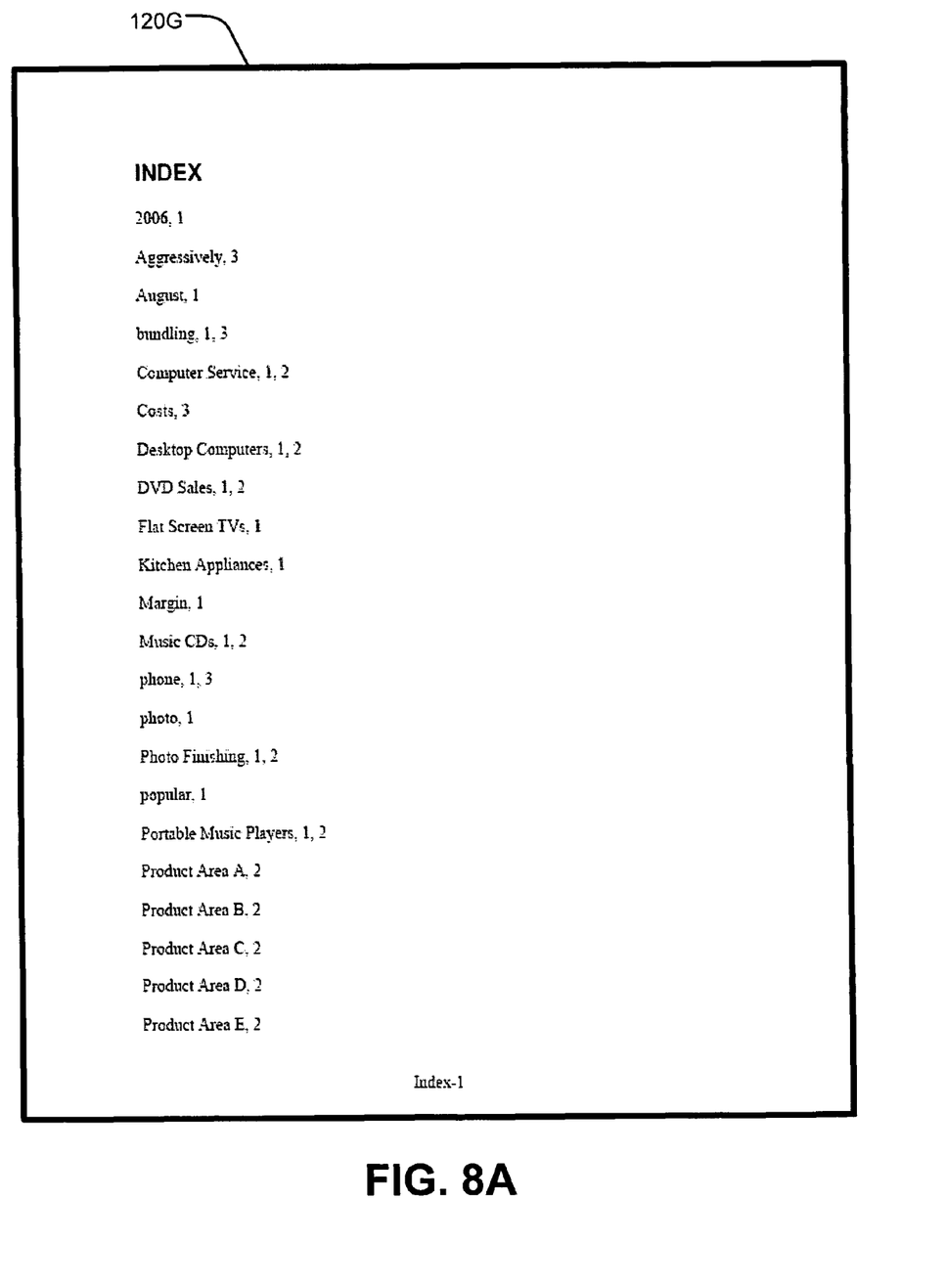
FIGS. 8A and 8B illustrate exemplary index pages for the exemplary page set of FIG. 3.
Figure 8B:
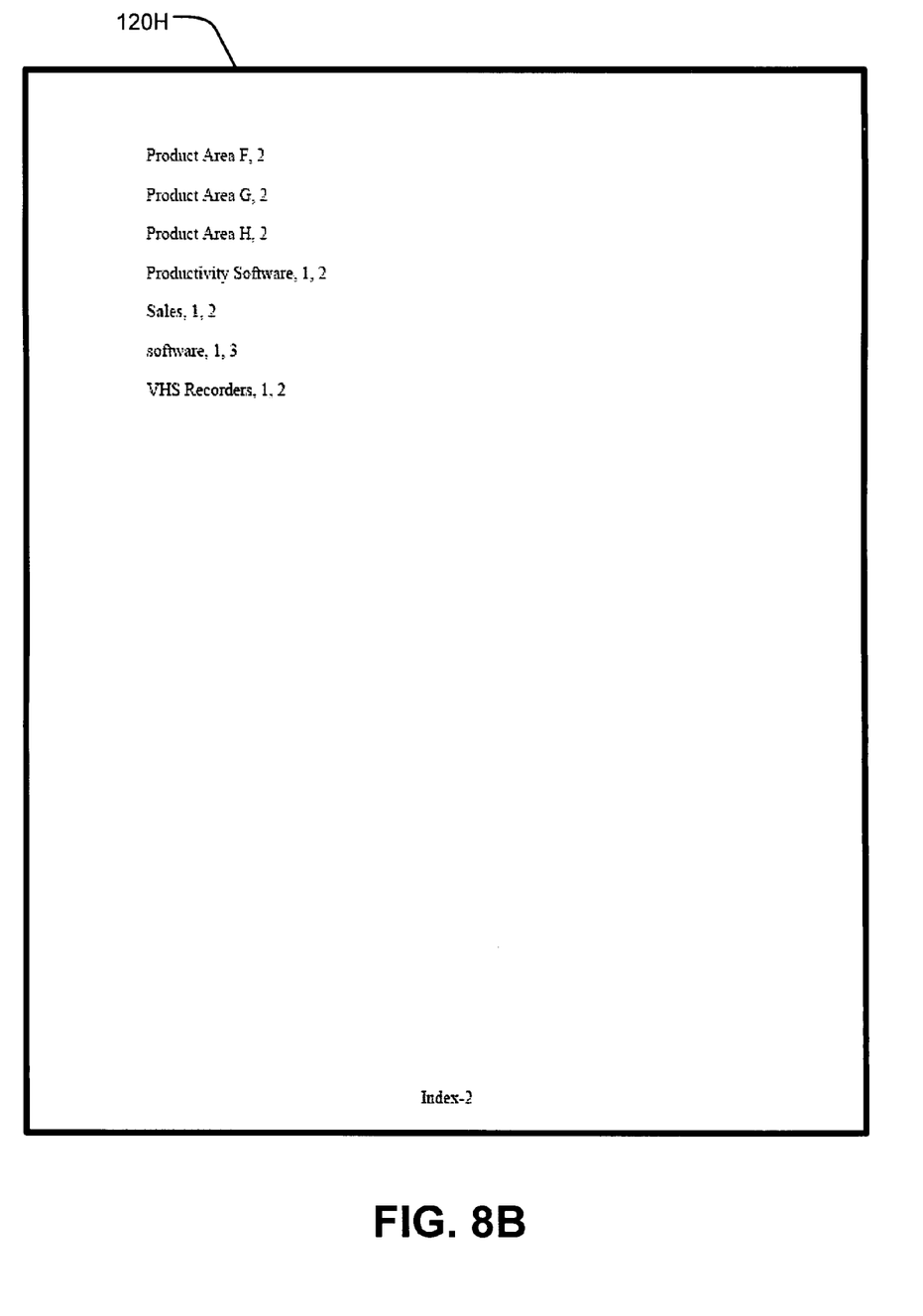

Pages 120G-120H of file Index.pdf, illustrated in FIGS. 8A-8B, are examined next. Potential folio value representations identified include: body strings ("2006", "A", "B", "C", "D", "E", "F", "G", "H", "1", "2", "3"); and footer strings ("Index-1", "Index-2"). As above, footer strings are given the highest probability because of their location and relative page number consistency. Thus, without additional information, pages 120G-120H could be associated with a prefixed integer folio scheme. Folio sequence 201C could be created with folio values 203F-203G assigned the values "Index-1" and "Index-2" respectively.

Figure 9:
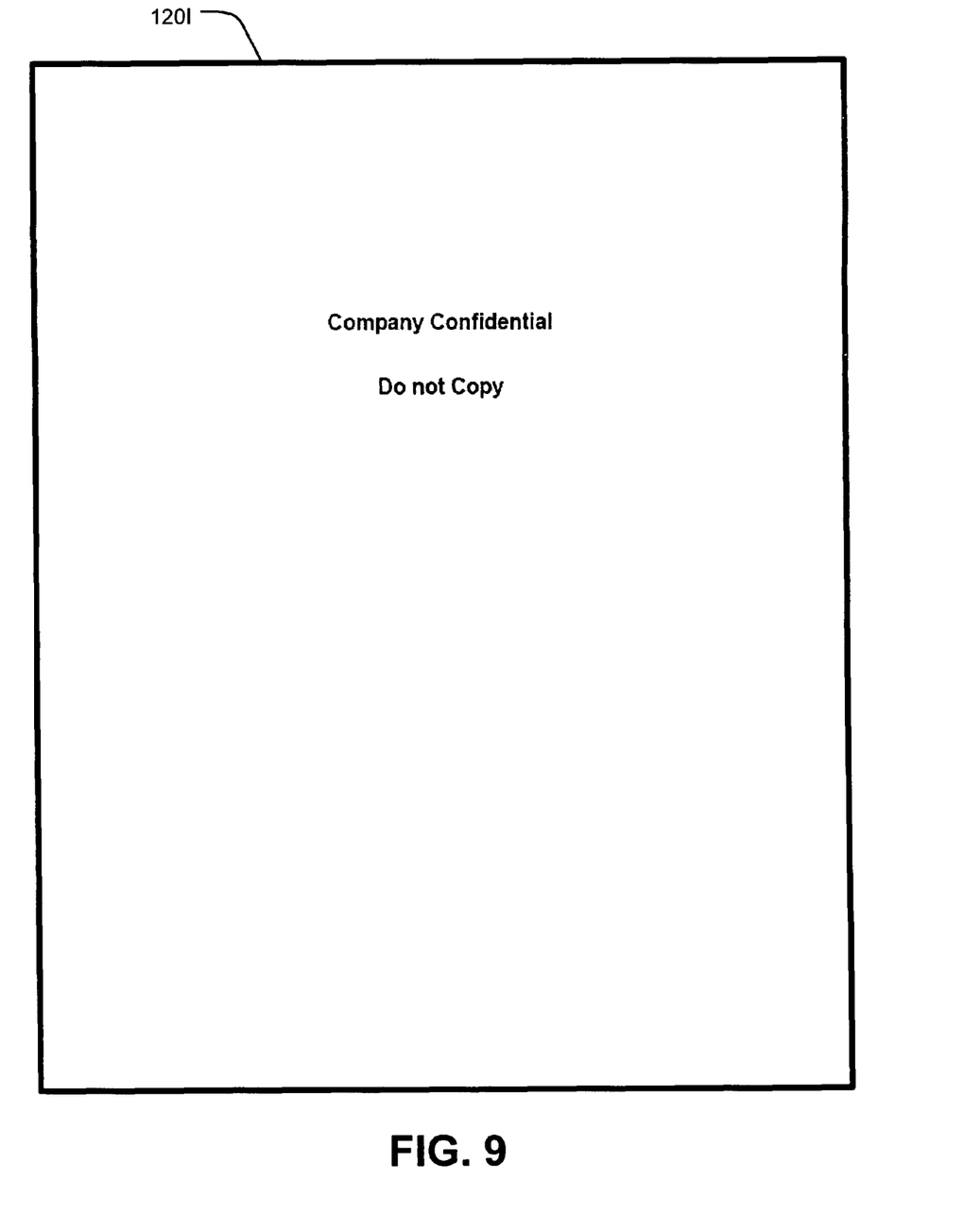
FIG. 9 illustrates an exemplary back cover page for the exemplary page set of FIG. 3.

Finally, page 120I of file Back.pdf, illustrated in FIG. 9, is examined. No potential folio value representations are identified and the page is declared an independent page.

Embodiments of the present invention may comprise any medium which carries a set of computer-readable signals comprising instructions which, when executed by a computer processor, cause the computer processor to execute a method of the invention. Embodiments may be in any of a wide variety of forms. Embodiments may comprise, for example, physical media such as magnetic storage media including floppy diskettes, hard disk drives, optical data storage media including CD ROMs, DVDs, electronic data storage media including ROMs, flash RAM, or the like or transmission-type media such as digital or analog communication links. The instructions may optionally be compressed and/or encrypted on the medium.

PARTS LIST

101 GUI
102 files pane
103 run list pane
104 signatures pane
110A-110E input file
120 page
120A-120J page
130 page set
131 page index
131A-131L page index
132 file reference
133 page symbol
201 folio sequence
201A-201C folio sequence
202 page sequence
202A-202C page sequence
203 folio value
203A-203G folio value

The invention claimed is:

1. A method for processing pages comprising:
obtaining a page set including an ordered plurality of pages;
automatically identifying a folio scheme for the page set by inferring the folio scheme based on information associated with the page set wherein inferring comprises:
identifying likely folio value representations for pages of the page set by examining the information, wherein examining comprises:
identifying at least one possible representation of a folio value amongst content associated with the page, and
selecting a subset of the at least one possible representation based on predefined folio value rules; and
identifying a likely folio scheme based on the likely folio value representations.

2. A method according to claim 1 further comprising:
creating a folio sequence for a page sequence of the page set wherein the folio sequence is based on the folio scheme and wherein information associated with the page sequence is consistent with the folio scheme.

3. A method according to claim 2 further comprising:
associating successive folio values of the folio sequence with successive pages of the page sequence.

4. A method according to claim 2 wherein creating the folio sequence for the page sequence comprises:
identifying a candidate page sequence for the folio scheme;
confirming that information associated with pages of the candidate page sequence is consistent with the folio scheme; and
creating the folio sequence corresponding to the confirmed candidate page sequence.

5. A method according to claim 2 wherein creating the folio sequence for the page sequence is performed automatically.

6. A method according to claim 2 including creating a plurality of folio sequences for a plurality of distinct page sequences.

7. A method according to claim 4 wherein confirming that information associated with pages of the candidate page sequence is consistent with the folio scheme comprises:
identifying likely folio value representations for pages of the candidate page sequence based on the information; and
determining that likely folio value representations for each page include a representation that corresponds with a folio value defined by the folio scheme for that position in the sequence.

8. A method according to claim 1 wherein inferring the folio scheme based on information associated with the page set comprises deriving the folio scheme from an attribute of a file including content for one or more pages of the page set.

9. A method according to claim 1 wherein identifying the folio scheme comprises selecting a folio scheme from a plurality of predefined folio schemes.

10. A method according to claim 9 wherein selecting the folio scheme from the plurality of predefined folio schemes comprises selecting based on a history of identifying the folio scheme.

11. A method according to claim 1 including creating an unconfirmed folio sequence for a page sequence of the page set wherein the unconfirmed folio sequence is based on the folio scheme and wherein content associated with the page sequence is partially consistent with the folio scheme.

12. A method according to claim 1 wherein the page set includes at least one file and a sequence of page reference values wherein each page reference value is associated with content for a page, the content for each page derived from the at least one file.

13. A method according to claim 1 wherein the predefined folio value rules include a rule indicating that a representation is more likely to correspond with a folio value if the location of the representation on the page is near a predetermined page location.

14. A method according to claim 1 wherein the predefined folio value rules include a rule indicating that a representation is more likely to correspond with a folio value if the page corresponds to a table of contents page or an index page.

15. A method according to claim 1 wherein a representation is a text string and identifying the at least one possible representation comprises searching for text strings that match a folio value pattern defined by a folio scheme.

16. A method according to claim 1 wherein optical character recognition methods are first applied to content to identify text strings amongst image content.

17. A method according to claim 1 wherein identifying the likely folio scheme comprises:

identifying at least one folio scheme based on the likely folio value representations; and determining which at least one folio scheme is more likely based on predefined folio scheme rules.

18. A method according to claim 17 wherein predefined folio scheme rules include a rule indicating that a folio scheme is more likely if likely folio value representations defined by content of sequential pages of the page set correspond with sequential folio values defined by the folio scheme.

19. A method according to claim 17 wherein predefined folio scheme rules include a rule indicating that for otherwise equally likely folio schemes, the folio scheme having the more complex folio value pattern is the more likely folio scheme.

* * * * *